US012782135B2

(12) United States Patent
Ondruska et al.

(10) Patent No.: US 12,782,135 B2
(45) Date of Patent: Nov. 3, 2026

(54) LOCALISATION OF MOBILE DEVICE USING IMAGE AND NON-IMAGE SENSOR DATA IN SERVER PROCESSING

(71) Applicant: Lyft, Inc., San Francisco, CA (US)

(72) Inventors: Peter Ondruska, London (GB); Lukas Platinsky, London (GB)

(73) Assignee: Lyft, Inc., San Francisco, CA (US)

( * ) Notice: Subject to any disclaimer, the term of this patent is extended or adjusted under 35 U.S.C. 154(b) by 446 days.

(21) Appl. No.: 18/231,038

(22) Filed: Aug. 7, 2023

(65) Prior Publication Data

US 2024/0118083 A1 Apr. 11, 2024

Related U.S. Application Data

(63) Continuation of application No. 16/472,767, filed as application No. PCT/GB2017/053874 on Dec. 21, 2017, now Pat. No. 11,761,766.

(Continued)

(30) Foreign Application Priority Data

Dec. 21, 2016 (GB) ..................................... 1621903

(51) Int. Cl.
*G01C 21/00* (2006.01)
*G01S 19/48* (2010.01)
(Continued)

(52) U.S. Cl.
CPC ....... *G01C 21/005* (2013.01); *G01C 21/3848* (2020.08); *G01S 19/485* (2020.05); *H04N 13/204* (2018.05)

(58) Field of Classification Search
CPC . G01C 21/005; G01C 21/3848; G01S 19/485; G01S 5/16; G01S 5/0018; H04N 13/204; G06T 7/0004
(Continued)

(56) References Cited

U.S. PATENT DOCUMENTS

| | | | |
|---|---|---|---|
| 6,377,210 | B1 | 4/2002 | Moore |
| 8,510,039 | B1 | 8/2013 | Troy et al. |

(Continued)

FOREIGN PATENT DOCUMENTS

| | | |
|---|---|---|
| EP | 0856746 | 8/1998 |
| EP | 1720037 | 11/2006 |

(Continued)

OTHER PUBLICATIONS

R. Clark, S. Wang, H. Wen, N. Trigoni and A. Markham, "Increasing the efficiency of 6-DoF visual localization using multi-modal sensory data," 2016 IEEE-RAS 16th International Conference on Humanoid Robots (Humanoids), Cancun, Mexico, 20161117, pp. 973-980, doi: 10.1109/HUMANOIDS.2016.7803390. (Year: 2016).*

(Continued)

*Primary Examiner* — Jonathan P Ouellette
(74) *Attorney, Agent, or Firm* — Sheppard, Mullin, Richter & Hampton LLP

(57) ABSTRACT

The present invention relates to method of localisation for devices. More particularly, it relates the use of both local and remote resources to provide substantially real time localisation at a device. According to an aspect, there is provided a method of determining a location of a device having one or more sensors comprising the steps of: sending a localisation request to a server system, the localisation request comprising at least a portion of data from the one or more sensors; receiving localisation data from the server system in response to the localisation request; and determining a location of the device from the received localisation data. Optionally, the method includes the further step of estimating a location of the device based on data from the one or more sensors and wherein the step of determining a location of the device includes determining the location of the device using the estimated location.

20 Claims, 4 Drawing Sheets

Related U.S. Application Data

(60) Provisional application No. 62/437,246, filed on Dec. 21, 2016.

(51) Int. Cl.
*H04N 13/204* (2018.01)
*H04N 23/00* (2023.01)

(58) Field of Classification Search
USPC .................................................. 705/1.1–912
See application file for complete search history.

(56) References Cited

U.S. PATENT DOCUMENTS

| | | | | |
|---|---|---|---|---|
| 8,855,929 | B2 | 10/2014 | Zhang et al. | |
| 9,037,396 | B2 * | 5/2015 | Pack | G01C 21/20 701/409 |
| 9,910,444 | B2 * | 3/2018 | Eade | G06F 16/444 |
| 10,051,434 | B2 * | 8/2018 | Chang | H04W 4/33 |
| 2005/0182518 | A1 * | 8/2005 | Karlsson | G06V 10/84 700/253 |
| 2007/0049267 | A1 | 3/2007 | Kota et al. | |
| 2007/0162225 | A1 | 7/2007 | Sorensen | |
| 2008/0137912 | A1 | 6/2008 | Kim et al. | |
| 2010/0201569 | A1 | 8/2010 | Lee et al. | |
| 2011/0285591 | A1 | 11/2011 | Wong | |
| 2011/0306323 | A1 | 12/2011 | Do et al. | |
| 2014/0217168 | A1 | 8/2014 | Do et al. | |
| 2015/0092061 | A1 | 4/2015 | Chao et al. | |
| 2015/0094952 | A1 | 4/2015 | Moeglein et al. | |
| 2015/0350846 | A1 | 12/2015 | Chen et al. | |
| 2016/0259032 | A1 | 9/2016 | Hehn et al. | |
| 2017/0086024 | A1 * | 3/2017 | Do | H04W 74/002 |
| 2017/0280301 | A1 | 9/2017 | Chang et al. | |
| 2022/0205783 | A1 * | 6/2022 | Chen | G06V 20/58 |

FOREIGN PATENT DOCUMENTS

| | | |
|---|---|---|
| JP | 2004213191 | 7/2004 |
| WO | 2003041388 | 5/2002 |
| WO | 2015013418 | 1/2015 |
| WO | 2015014018 | 2/2015 |
| WO | 2015048434 | 4/2015 |

OTHER PUBLICATIONS

J. Ventura, C. Arth, G. Reitmayr and D. Schmalstieg, "Global Localization from Monocular SLAM on a Mobile Phone," in IEEE Transactions on Visualization and Computer Graphics, vol. 20, No. 4, pp. 531-539, Apr. 2014, doi: 10.1109/TVCG.2014.27. (Year: 2014).*

European Application No. 17822768.2, Search Report mailed Aug. 10, 2021, 6 pages.

* cited by examiner

LOCALISATION OF MOBILE DEVICE USING IMAGE AND NON-IMAGE SENSOR DATA IN SERVER PROCESSING

CROSS-REFERENCE TO RELATED APPLICATIONS

This application is a continuation of U.S. patent application Ser. No. 16/472,767, filed on Jun. 21, 2019, which is a national stage application pursuant to 35 U.S.C. § 371 of International Application No. PCT/GB2017/053874 filed Dec. 21, 2017, which claims priority to Great Britain Patent Application No. 1621903.2 filed Dec. 21, 2016 and U.S. Provisional Patent Application Ser. No. 62/437,246 filed Dec. 21, 2016, the disclosures of which are hereby incorporated by reference herein.

FIELD

The present invention relates to method of localisation for devices. More particularly, the present invention relates the use of both local and remote resources to provide substantially real time localisation at a device.

BACKGROUND

The capability for devices to determine with a high degree of precision where the device is located within a three-dimensional space, for example with precision within a centimetre, is likely to be pivotal for many robotics, augmented, and virtual reality applications.

For example, this level of precision can allow a robot to operate safely and efficiently in its environment or can allow the display of augmented content at the appropriate place accurately.

This level of precision cannot be achieved with current satellite global position technologies for various reasons, including for example due to the challenging environmental conditions experienced in at least some if not most locations (atmospheric effects, the reflection of waves in urban environments, sky visibility etc.). In particular, satellite position within buildings and dense urban environments is typically very imprecise.

Moreover, for localisation functionality with the above-mentioned level of precision to be useful in robotics and augmented reality applications, it must be sufficiently robust. For it to be sufficiently robust such localisation should work persistently, in all weather conditions, in changing environments, both indoors and outdoors, at city-level scale, and in real-time.

Classical SLAM (simultaneous localisation and mapping) solutions are not sufficiently robust, as they are typically not appropriate for both large scale use and with the degree of environmental change observed in the real world, as most implementations are designed for experiments in a certain set of environmental conditions and within a certain size of map to avoid requiring a large amount of storage and processing power being required.

SUMMARY OF INVENTION

Aspects and/or embodiments seek to provide a distributed localisation and/or mapping system capable of delivering substantially high-accuracy real-time localisation at a device.

According to a first aspect, there is provided a method of determining a location of a device having one or more sensors comprising the steps of: sending a localisation request to a server system, the localisation request comprising at least a portion of data from the one or more sensors; receiving localisation data from the server system in response to the localisation request; and determining a location of the device from the received localisation data.

Optionally, the method includes the further step of estimating a location of the device based on data from the one or more sensors and wherein the step of determining a location of the device includes determining the location of the device using the estimated location.

Determining the location of a device using localisation data from a server system, using data from one or more sensors, can allow a device to localise using a large amount of map data and significant processing power (at a server system) without needing the device to have significant processing power, data storage or bandwidth.

Optionally the step of determining a location of the device further comprises using at least a portion of the data from the one or more sensors along with the received localisation data.

Using the sensor data can allow the device to determine or estimate what has changed between the time of sending the localisation request and receiving the localisation data, thus allowing an estimate of the movement since the sending of the localisation request and therefore more accurately determine the current position of the device. For example, the odometry system can use sensor data to determine how much further the device has moved since sending the localisation request.

Optionally, the localisation request further comprises an estimated location.

Optionally, the step of determining a location of the device includes any of: determining the location of the device at the point in time that the localisation request was sent to the server system; or determining the current location of the device taking into account the point in time that the localisation request was sent to the server system.

Determining the location of the device can involve determining the location of the device at the point at which it transmits the localisation data, or the point at which the localisation data is captured, or can involve determining the current position (or future position) based on for example movement data, speed data or previous localisation requests.

Optionally, said one or more sensors comprises at least one visual data sensor. Optionally, said at least one visual data sensor comprises any or a combination of: an image camera; a video camera; a monocular camera; a depth camera; a stereo image camera; a high dynamic range camera, a light detection and ranging sensor; a radio detection and ranging sensor.

Optionally, said at least a portion of the data from the one or more sensors comprises visual data from the at least one visual data sensor.

Using visual data such as from an image camera; a video camera; a monocular camera; a depth camera; a stereo image camera; a high dynamic range camera, a light detection and ranging sensor; or a radio detection and ranging sensor can allow localisation of a device by a server system based on known visual data stored by the server system.

Optionally, data from said one or more sensors is combined with data from an inertial measurement unit and/or a satellite positioning system.

Using inertial measurement can allow a device to estimate its location based on movement relative to one or more previous known locations. Using data from a satellite positioning system (GPS) helps to narrow the location search.

Optionally, the step of estimating a location further comprises using previous localisation data.

Optionally, previous localisation data comprises any of: one or more previous estimates of location; one or more previous localisation requests; one or more of previous said localisation data received from the server system in response to previous said localisation requests; and previous determinations of location. Optionally, the step of estimating a location is performed using any of: a local pose; or a local frame of reference. Optionally, the localisation data received from the server system in response to said localisation request uses any of: a global pose; or a global frame of reference. Optionally, a global to local pose transform or relationship; or a global frame of reference to local frame of reference transform or relationship is determined.

Previous localisation data can be used by a device to more accurately determine or estimate its location. By establishing a correlation, or transform, or relationship between the local frame of reference of the estimated locations and determined locations and the localisation data from the server system, a device can sometimes more accurately estimate or determine its position.

Optionally, the device comprises any of a mobile phone, a robot, augmented reality or virtual reality headset, or navigation device, a self-driving vehicle, a drone or other autonomous vehicle.

Many devices can be used with this aspect in order to determine their location using the method of this aspect.

Optionally, the step of determining the location of the device is accurate to within a several centimetres, optionally to within a centimetre. Optionally, the method is persistent. Optionally, determining the location of the device can be performed inside buildings or in dense urban areas. Optionally, the sensor data comprises data on environmental conditions such as weather conditions.

The method of this aspect can be very accurate, and can be operational continuously to allow devices to determine their location accurately, and can be used inside buildings or in dense urban areas or in different environmental or weather conditions to determine the location of a device.

Optionally, the server system comprises global map data; optionally wherein the global map data comprises any of: one or more sets of local map data and/or one or more sets of global map data and/or one or more global maps of interconnected local maps.

The server system can store a large amount of map data in a global master map in order to provide relevant localisation data from the global master map data to devices when requested to do so. Optionally, one or more sets of local map data and/or one or more sets of global map data can be stored within the global master map data.

Optionally, the server system can be any of: a single server, a distributed server system, a cloud system, a physical system or a virtual system. Optionally, the global map can be distributed between a plurality of server systems. Optionally, the global map can be hosted in a peer-to-peer arrangement on any of: one or more devices acting as a server system, or a mix of one or more server systems and one or more devices.

The server system can be configured in a number of different ways in order to balance usage between computer hardware efficiently and with lower latency, or even between a mix of client devices and/or server systems.

Optionally, the device and server system communicate over any of: a mobile data network, or wireless data network.

The devices can typically operate over a mobile data network, but can operate using other data networks.

Optionally, the device has an odometry system. Optionally, the odometry system processes sensor data to determine relative position differences between successive sensor data.

Optionally, the position estimates have between three and six degrees of freedom. Optionally, the odometry system performs full simultaneous location and mapping and/or loop closure and/or graph optimisation. Optionally, the odometry system outputs the estimated position. Optionally, the estimated position is relative to a local origin.

An odometry system can use the inputs from the sensors on the device to estimate the location of the device, and can use the relative position differences determined from successive data from the sensors to determine relative movement of the device and therefore movement in the local frame of reference of the device in order to estimate the position of the device. The method can work to provide localisation in a number of different dimensions, including in two- and three-dimensions (but also in other numbers of dimensions, including for example one-dimension).

Optionally, the previous localisation data is stored with a timestamp.

By providing a timestamp on localisation data, data from different sources and stored in different data stores can be compared in order to estimate and/or determine the position of the device. Timestamp data can be provided by storing for example GPS data.

Optionally, the location of the device is determined in a global co-ordinate frame. Optionally, wherein the localisation request is in a local co-ordinate frame. Optionally, the method further comprises the step of determining a transform between the global co-ordinate frame and the local co-ordinate frame. Optionally, the localisation data is in a global co-ordinate frame.

By determining a location in a global co-ordinate frame, the device can accurately localise within a global frame of reference. By operating in a local co-ordinate frame, the device can co-ordinate its sensor data and/or odometry data and/or estimated position. By determining a local-to-global transform, the device can determine its global position from its local position and/or from localisation data and/or from sensor data.

According to a second aspect, there is provided a method of determining localisation data at a server system comprising the steps of: receiving a localisation request from one or more client systems, the localisation request comprising at least a portion of data from one or more sensors; determining relevant localisation nodes from a global map and aggregating this data as localisation data; sending the localisation data to the relevant one or more client systems in response to the localisation request. Optionally, the localisation request includes an estimated location of the respective one or more client systems.

Determining localisation data for a client system or device using localisation requests from a client system, using data from one or more sensors, can allow a client system to determine its location using a large amount of map data and significant processing power of a server system without needing the client system to have significant processing power, data storage or bandwidth. Alternatively, to determining relevant localisation nodes, other data can be determined and/or extracted and/or aggregated from the global map to be sent to the client systems as localisation data. Optionally no aggregation needs to be performed.

Optionally, either the localisation data is operable to determine a location of the device at a point in time that the localisation request was sent to the server system; or the localisation data is operable to determine the current location of the device taking into account the point in time that the localisation request was sent to the server system.

Determining the location of the device can involve determining the location of the device at the point at which it transmits the localisation data, or the point at which the localisation data is captured, or can involve determining the current position (or future position) based on for example movement data, speed data or previous localisation requests.

Optionally, a further step is performed of providing feedback data to one or more client systems to send more data or less said portion of data.

Providing feedback data to the client system(s) can prevent the client system(s) from sending too much data to the server system when not required for localisation or updating the global master map at the server, or can trigger the client system(s) to send more data in order to allow refinement or building of the global master map at the server.

Optionally, a further step is performed of updating the global map with at least a portion of the said at least a portion of data from one or more sensors received from the one or more client systems.

The global map or global master map can be updated with new or updated information gathered by the sensors of the client device(s).

Optionally, said one or more sensors comprises at least one visual data sensor. Optionally, said at least one visual data sensor comprises any or a combination of: an image camera; a video camera; a monocular camera; a depth camera; a stereo image camera; a high dynamic range camera, a light detection and ranging sensor; a radio detection and ranging sensor. Optionally, said at least a portion of the data from the one or more sensors comprises visual data from the at least one visual data sensor.

Using visual data such as from an image camera; a video camera; a monocular camera; a depth camera; a stereo image camera; a high dynamic range camera, a light detection and ranging sensor; or a radio detection and ranging sensor can allow localisation of a device by a server system based on known visual data stored by the server system.

Optionally, data from said one or more sensors is combined with data from an inertial measurement unit and/or a satellite positioning system.

Using inertial measurement can allow a device to estimate its location based on movement relative to one or more previous known locations. Using data from a satellite positioning system (GPS) helps to narrow the location search.

Optionally, the step of estimating a location further comprises using previous localisation data. Optionally, previous localisation data comprises any of: one or more previous estimates of location; one or more previous localisation requests; one or more of previous said localisation data received from the server system in response to previous said localisation requests; and previous determinations of location. Optionally, the step of estimating a location is performed using any of: a local pose; or a local frame of reference. Optionally, the localisation data received from the server system in response to said localisation request uses any of: a global pose; or a global frame of reference. Optionally, a global to local pose transform or relationship; or a global frame of reference to local frame of reference transform or relationship is determined.

Previous localisation data can be used by a device to more accurately determine or estimate its location. By establishing a correlation, or transform, or relationship between the local frame of reference of the estimated locations and determined locations and the localisation data from the server system, a device can sometimes more accurately estimate or determine its position.

Optionally, the device comprises any of a mobile phone, a robot, augmented reality or virtual reality headset, or navigation device, a self-driving vehicle, a drone or other autonomous vehicle.

Many devices can be used with this aspect in order to determine their location using the method of this aspect.

Optionally, the step of determining the location of the device is accurate to within several centimetres, optionally to within a centimetre. Optionally, the method is persistent. Optionally, determining the location of the device can be performed inside buildings or in dense urban areas. Optionally, the sensor data comprises data on environmental conditions such as weather conditions.

The method of this aspect can be very accurate, and can be operational continuously to allow devices to determine their location accurately, and can be used inside buildings or in dense urban areas or in different environmental or weather conditions to determine the location of a device.

Optionally, the server system comprises global map data; optionally wherein the global map data comprises any of: one or more sets of local map data and/or one or more sets of global map data and/or one or more global maps of interconnected local maps.

The server system can store a large amount of map data in a global master map in order to provide relevant localisation data from the global master map data to devices when requested to do so. Optionally, one or more sets of local map data and/or one or more sets of global map data can be stored within the global master map data.

Optionally, the server system can be any of: a single server, a distributed server system, a cloud system, a physical system or a virtual system. Optionally, the global map can be distributed between a plurality of server systems. Optionally, the global map can be hosted in a peer-to-peer arrangement on any of: one or more devices acting as a server system, or a mix of one or more server systems and one or more devices.

The server system can be configured in a number of different ways in order to balance usage between computer hardware efficiently and with lower latency, or even between a mix of client devices and/or server systems.

Optionally, the device and server system communicate over any of: a mobile data network, or wireless data network.

The devices can typically operate over a mobile data network, but can operate using other data networks.

Optionally, the device has an odometry system. Optionally, the odometry system processes sensor data to determine relative position differences between successive sensor data. Optionally, the position estimates have between three and six degrees of freedom. Optionally, the odometry system performs full simultaneous location and mapping and/or loop closure and/or graph optimisation. Optionally, the odometry system outputs the estimated position. Optionally, the estimated position is relative to a local origin.

An odometry system can use the inputs from the sensors on the device to estimate the location of the device, and can use the relative position differences determined from successive data from the sensors to determine relative movement of the device and therefore movement in the local frame of reference of the device in order to estimate the position of the device.

Optionally, the previous localisation data is stored with a timestamp.

By providing a timestamp on localisation data, data from different sources and stored in different data stores can be compared in order to estimate and/or determine the position of the device. Timestamp data can be provided by storing for example GPS data.

Optionally, the location of the device is determined in a global co-ordinate frame. Optionally, wherein the localisation request is in a local co-ordinate frame. Optionally, the method further comprises the step of determining a transform between the global co-ordinate frame and the local co-ordinate frame. Optionally, the localisation data is in a global co-ordinate frame.

By determining a location in a global co-ordinate frame, the device can accurately localise within a global frame of reference. By operating in a local co-ordinate frame, the device can co-ordinate its sensor data and/or odometry data and/or estimated position. By determining a local-to-global transform, the device can determine its global position from its local position and/or from localisation data and/or from sensor data.

According to a third aspect, there is provided a method of updating a global map at a server system comprising the steps of: receiving sensor data from one or more client systems; and adding the sensor data to the global map. Optionally, estimated location data is received along with sensor data. Optionally, the step of adding the sensor data to the global map comprises any of: creating a new node in the global map; updating or amending an existing node in the global map; or deleting a node in the global map. Optionally, the sensor data comprises any of: environmental data; or weather data; satellite positioning data; inertial measurement data; image data; or video data. Optionally, a further step is performed of optimising the global map. Optionally, the step of optimising comprises performing global loop-closures to link positions of different localisation nodes.

Updating the global map or global master map using sensor data from client systems can allow the global map to adapt over time and continuously improve, including by growing larger in size and richer in data for, for example, different environmental conditions.

Optionally, a further step is performed of sending an instruction to the one or more client systems to provide more or less sensor data to the server system.

Providing an instruction to the client system(s) can prevent the client system(s) from sending too much data to the server system when not required for localisation or updating the global map at the server, or can trigger the client system(s) to send more data in order to refine or build the global map at the server.

Optionally, updating the global map is performed at intervals, optionally at time intervals or regular time intervals, or optionally when a predetermined threshold of sensor data has been received It can be more efficient to performed updating of the global map or global master map at intervals, for example at regular time intervals or at points where a certain threshold of amount of data has been received or data relating to a certain number of nodes or new nodes has been collected.

According to a fourth aspect, there is provided a system comprising at least one server system or apparatus operable to perform the method of the first aspect and at least one client system or apparatus operable to perform the method of the second aspect.

The terms server system and client system, throughout the specification, can respectively be replaced with server apparatus and client apparatus.

According to a fifth aspect, there is provided a computer program product for providing the method or system of the above aspects.

BRIEF DESCRIPTION OF DRAWINGS

Embodiments will now be described, by way of example only and with reference to the accompanying drawings having like-reference numerals, in which.

SPECIFIC DESCRIPTION

An example embodiment will now be described with reference to FIG. 1.

Figure 1:
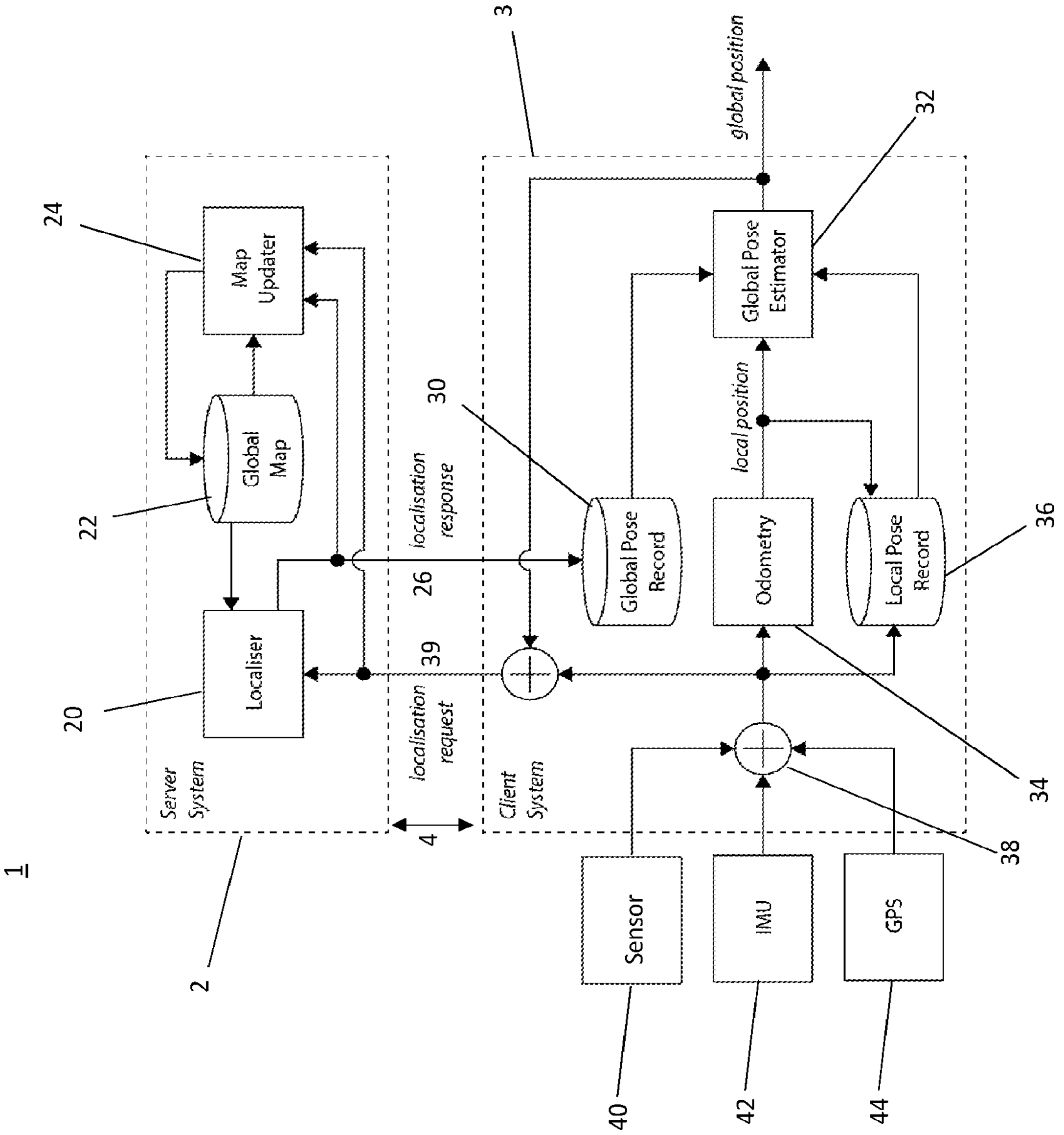
FIG. 1 illustrates an overview of the system according to an embodiment.

In the embodiment of FIG. 1, the system 1 comprises one server system 2 communicating with at least one client system 3.

The server system 2 of this embodiment will now be described in more detail below.

In this embodiment, the server system 2 is running on and implemented using cloud infrastructure, but in other embodiments the server system 2 may have a variety of physical and/or virtual configurations. In other embodiments, for example, there may be one or more servers and/or server systems and, where there are more than one servers and/or server systems, these may be configured to act as a single server or server system or as multiple independent servers or server systems and may or may not be in direct communication with each other.

A global master map 22 is maintained at the server system 2, the global master map 22 having or using a global frame, i.e. co-ordinates providing a global frame of reference. Each client system 3 has or uses its own local frame, i.e. local frame of reference. In some embodiments, however, the global master map may comprise multiple local and/or global maps, each with their own respective local and/or global reference frame. The client system 3 and/or server system 2 may not be able to relate the local reference frames of multiple client systems 3 to each other so these may need to exist as separate local and/or global maps within the global master map. For example, where a client system 3 is operating indoors, for example in a factory, and has no need to leave the factory then it will not usually be possible, for example with GPS co-ordinates, to relate this to outdoor local maps or other local and/or global map(s) relevant to other client systems 3.

In this embodiment, a global master map 22 is stored on the server system 2, and the global master map 22 can be shared with client devices 3 in communication with the server system 2. In some embodiments, the global master map 22 can be continuously or periodically updated, for example with data provided from the client devices 3. In some embodiments, the global master map 22 can be refined based on data provided, or calculations or operations performed on relevant data. In some embodiments, the global master map 22 can be used for localisation by the server system 2 and/or one or more of the client devices 3. In some embodiments, all or a portion of the global master map 22 may be stored in a distributed fashion across a plurality of server instances or cloud infrastructure.

The system of some, or all, of these embodiments can be used in distributed large-scale scenarios with low-cost client hardware, such as mobile phones, and/or with any, or all, of: augmented reality headsets, self-driving cars, drones, and other robots.

The server system 2 and client system 3 are in communication with each other, typically through a bandwidth-restricted communication channel, and in this embodiment for example the communications channel 4 is a mobile 'phone cellular data network. In other embodiments, other wireless data networks may be used instead or in addition to a mobile 'phone cellular data network.

The role of the server system 2 in this embodiment is to maintain and update a consistent global master map 22, and to respond to global localisation requests 39 from client devices 3 using the global master map 22 data stored on the server system 3. In this embodiment, where the communications are typically made over a bandwidth-restricted communication channel, it is anticipated that the global localisation requests 39 from each client device occur with low frequency in order to minimise bandwidth usage and/or utilise the bandwidth available in an efficient manner. A localisation response 26 is sent by the server system 2 to the client system 3 that sent the localisation request 39.

The client system 3 of this embodiment will now be described in more detail.

The client system 3 comprises a global pose record 30, which is in communication with the server system 2 and receives localisation responses 26 from the server system 2. The global pose record 30 is in communication with the global pose estimator 32. The global pose estimator 32 is also in communication with the local pose record 36 and the odometry system 34. The global pose estimator 32 outputs the estimated global position of the client system 3. The odometry system 34 and the local pose record are in communication with the sensors, for example including sensor 40 (which can be an image sensor or video sensor, depth camera sensor or LIDAR sensor), and optionally an inertial measurement unit IMU 42 and satellite positioning system (such as GPS, for example) 44, which can be combined or blended 38. The global pose estimator 32 outputs the estimated global position of the client system 3 and this can be combined with the combined data 38 to be sent as a localisation request to the server system 2.

The one or more client systems 3 of this embodiment run on client hardware equipped with at least one sensor 40, for example devices such as a mobile 'phone, augmented reality headset, drone, or autonomous car driving system. The client hardware can, for example, be any one or a combination of: visible spectrum cameras, depth cameras, LIDAR sensors, IMU 42 and/or satellite positioning system 44.

The role of each client system 3 is to process client system data acquired from at least one of the sensors 40, IMU 42 and satellite positioning system 44, communicate with the server system 2, and maintain a real-time global position estimate of the client system 3.

The client system 3 comprises an odometry system 34 which processes the client combined data and translates this data into relative position differences. Based on the sensor used (or in combination with IMU 42 and/or satellite positioning system 44) this can be implemented in several ways. For example, in the case of a camera sensor, the camera movement can be determined by matching and triangulating observed image features or pixel intensities in between successive measurements to provide visual odometry. Mesh-matching methods such as iterative closest point optimisation can be used to achieve similar pose estimates in active sensors such as depth cameras or LIDAR sensors. Alternatively, this system can be solely based on or aided by an inertial measurement unit (IMU). Furthermore, several such measurements coming from different sensors and modalities can be integrated into one pose estimate using methods such as Kalman Filtering to compensate for individual sensor drawbacks and to achieve higher robustness and accuracy.

From the client combined data and/or relative position differences, measurements are then accumulated to provide relative real-time position estimates. In the most general case the position estimates take the form of a pose with six degrees-of-freedom (three-dimensional rotation and three-dimensional translation), but in the case of embodiments relating to, for example, planar automotive scenarios this can be reasonably reduced to three degrees of freedom (rotation and two-dimensional translation). In some embodiments, only one degree of freedom can be used.

A property of odometry is that it typically accumulates an error over time if based purely on local sensor data and estimates—a problem known as "drift". Optionally, to mitigate this effect, odometry can be extended to a full client simultaneous location and mapping (SLAM) system utilizing loop closure and graph optimisation procedures. Implementations of such systems will depend on the type of sensor used, such as, for example monocular or stereo camera, depth camera, or laser sensors.

The output of the odometry system 34 can provide a substantially high-quality estimate (or estimates) of device position in relation to some arbitrary local origin (the arbitrary local origin is typically the position of the device where the system started or initiated). To achieve global localisation (i.e. a substantially high-accuracy position in a global map), a relative position to the local origin in the global coordinate map must be estimated. To achieve this, the client system 3 regularly performs "global localisation requests" 39 to the server system 2. A summary of recent sensor inputs in a form of, for example, image or video data, depth maps, features, relationship to previous localisation requests etc. is aggregated to create a localisation request 39. Sometimes, for a particular frame, data will only be available from one, typically high frequency sensor, such as an IMU and so only this data is transmitted in the localisation request 39. For a typical frame, data may be available from a plurality of sensors, for example an image from a visual sensor along with IMU data, which can be transmitted in the localisation request 39. As the bandwidth between the client system 2 and server system 3 is limited, this localisation request 39 is usually of a much smaller data size and performed at much lower frequency than the related equivalent raw sensor data but given sufficient bandwidth the raw sensor data can optionally be streamed directly to the server system as a continuous localisation request (and similarly the localisation response from the server can then be intermittent or continuous).

This localisation request 39 is then sent to a localiser module or (sub-)process 20 at the server system 2. Simultaneously the current estimate of the device position in the local coordinate frame produced by the odometry is added to the client "local pose record" database 36. The localiser 20 at the server system 2 responds to the localisation request 39 from the client device 3 with an estimate of the "global pose" of the device 3 at a time of the issued localisation request 39, sent by the server system 2 as a localisation response 26. This localisation response 26, when received by the client system 3, is then stored in the "Global Pose Record" database 30 on the client system 3. Provided that at least one localisation request 39 was successfully responded to, the relative and global pose of these requests are retrieved from Local and Global Pose Records 36, 30 and compared to provide the estimate of the local origin pose in the global map of the client system 3. This estimate is then combined with subsequent high-frequency device pose/location estimates in the local coordinate frame from the odometry system 34 to provide a high-frequency device pose, or location, in the global coordinate frame. This can be achieved by translating high-frequency device pose/location estimates by the estimated local to the global coordinate frame transform. Alternatively, further optimisation can be performed to combine local position estimates with one or more responses based on properties of local odometry and global localisation system (for example, GPS).

In some embodiments, the information stored in the local and/or global pose records is a list of local and/or global positions of the device. Each position is associated with a particular time and unique timestamp or ID. In some embodiments, as an alternative or addition, each position can be associated with GPS data which can include timestamp data. The aforementioned time might be that of a particular sensor measurement, and the timestamp or ID can be used to cross-reference the local and global record. Relating the local and global pose of one or multiple device poses together with the current local device pose gives the current global device pose. In other embodiments, additional or alternative information can be stored in the local or global pose records.

Figure 2:
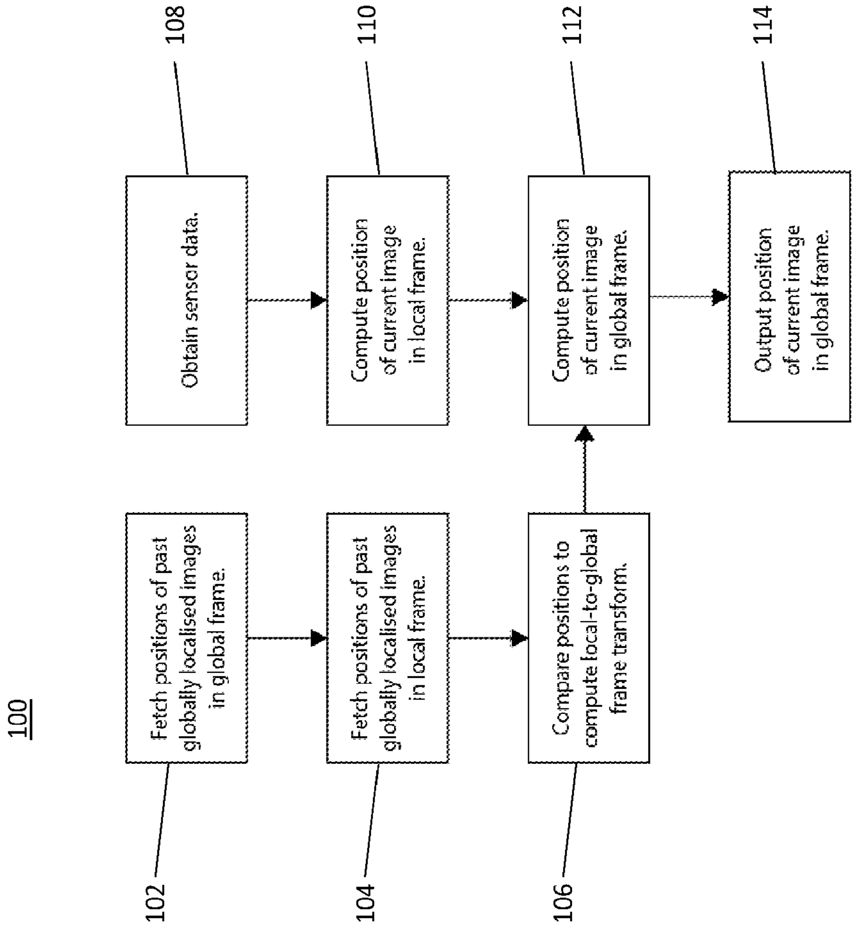
FIG. 2 illustrates a flowchart showing the client system operation according to an embodiment.

The principle of operation 100 of the client system 3 is set out in the flowchart of FIG. 2, which will now be described in further detail.

First, or in parallel with normal operation, the client system 3 needs to determine a local-to-global frame transform. In step 102, the client system 3 carries out the step of fetching the positions of past globally localised images in the global frame from the global pose record 30. Then, in step 104, the client system 3 carries out the step of fetching the positions of past globally localised images in the local frame from the local pose record 36. Next, in step 106, the positions are compared in order to compute a local-to-global frame transform.

For normal operation, the client system 3 in step 108 obtains or receives sensor data, for example image or video data from a camera. Then, in step 110, the client system 3 computes the position of the current image from the camera in the local frame. Next, in step 112, and using the previously- or parallel-computed local-to-global frame transform determined in step 106, the client system 3 computes the position of the current image from the camera in the global frame. Then, in step 114, the client system outputs the position of the current image in the global frame.

The server system 2 of this embodiment will now be described in further detail with reference to FIG. 1.

The server system 2 comprises three modules, systems or sub-systems: the global master map 22, localiser 20 and map updater 24.

The global master map 22 is in communication with the localiser 20, and the localiser 20 can retrieve data from the global master map 22 as needed to perform the functions of the localiser 20. The map updater 24 is also in communication with the global master map 22 and can both input to and retrieve data from the global master map 22. The map updater 24 also receives data received by the server system 2 from client systems 3, specifically localisation requests 39. The map updater 24 is also in communication with the localiser 20 and also receives the localisation responses 26 sent by the localiser 20 in response to each localisation request 39.

The global master map 22 comprises a collection of localisation nodes. Each localisation node summarises a particular sensory experience at a particular place (such as a picture, position of visual features, depth map or three-dimensional point cloud of the environment, for example) and, optionally, metadata (such as a combination of different weather conditions and/or lighting conditions, for example) required for the purpose of localiser 20 operation. Each localisation node has an estimate of its pose assigned to it in the global co-ordinate frame. In addition, for the purpose of map updater 24 functionality, the global master map 22 might contain links or cross-references/relationships between localisation nodes and their positions within the global master map 22.

Figure 3:
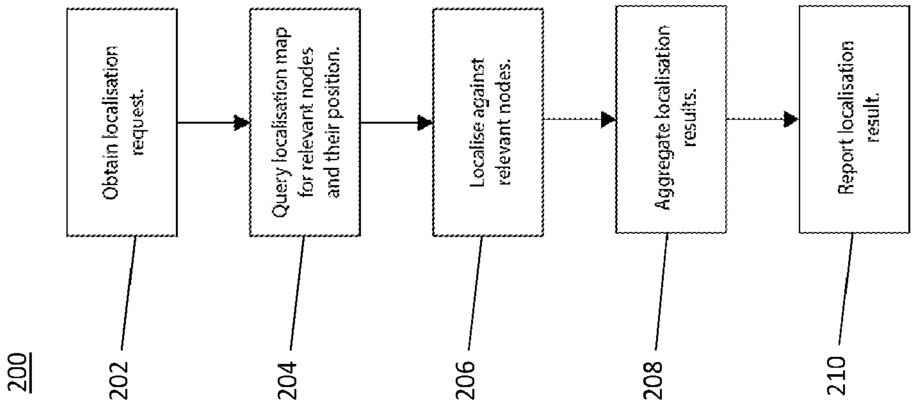
FIG. 3 illustrates a flowchart showing the localiser operation according to an embodiment.

With reference to FIG. 3, the localisation process occurring at the server system 2 will now be described.

In step 202, the localiser 20 receives one or more localisation requests 39 from one or more client systems 3. When a localisation request 39 is received, in step 204 the localiser 20 searches the global master map 22 for relevant localisation nodes capturing similar past sensory experiences from the localisation request 39, termed querying the localisation map for relevant nodes and their positions.

Several different methods can be used together or separately to find relevant localisation nodes. The search can be performed by extraction of visual signatures, for example those based on image features or a neural-network-based encoding to search for nodes with a similar signature by using data acquired from the one or more sensors 40. Additionally, the search can be accelerated based on a location estimate, for instance as given by device satellite (e.g. GPS) position or the history of its previous localisation requests to consider only nodes in a nearby area. Various statistical methods such as tf-idf can be further used to exploit statistical properties and relevance of the individual localisation nodes for the purpose of localisation.

In step 206, based on the data stored in the localisation node and localisation request 39, the localisation process then performs relative pose estimation between the global position of the localisation node and the localisation request 39 to determine the global pose of the client device 3 at the time of issuing the request (i.e. to localise against what are determined to be the relevant nodes of the localisation map). This information is then reported back to the client system in the form of localisation response 26, where the information is aggregated in step 208 from the localisation results from step 206 and then reported in step 210. Optionally, the localisation response can contain part of the master map to be transmitted to the client device to serve localisation requests locally on the client device.

Figure 4:
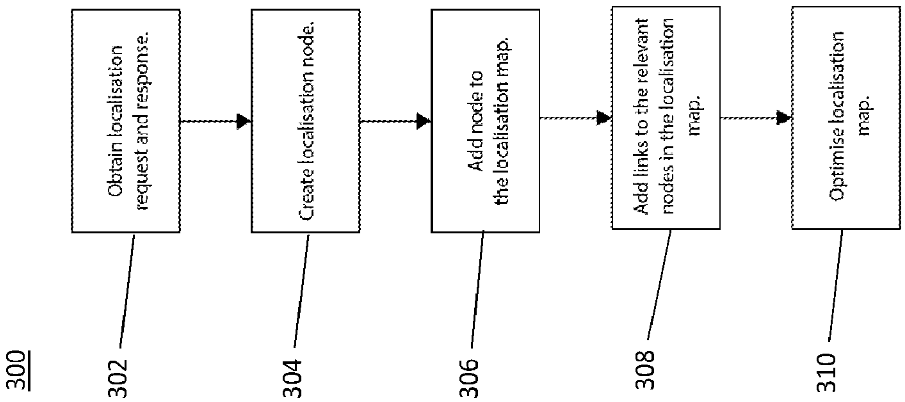
FIG. 4 illustrates a flowchart showing the map updater operation according to an embodiment.

Simultaneously the map updater 24 is notified with the localisation request 39 and response 26, in order to queue the incoming data in order to perform map refinement at regular intervals to update the global master map 22 with data from one or more localisation requests received at the server system, which will now be described with reference to the flow chart in FIG. 4. While in some embodiments the global master map 22 can be updated every time a new localisation request 39 is received, batch optimisation can allow for the process of updating the global master map 22 to be performed more efficiently at intervals.

In step 302, when the map updater 24 receives notification of localisation requests 39 and responses 26, the map updater 24 extracts the information from the localisation request 39 and response 26. The information extracted from the localisation request 39 and response 26 is used to update or create new localisation node in the global master map 22 in step 304. The updated or created new localisation node is included in the global master map 22 in step 306, which might result in an extension of the global master map 22. Further, links can optionally be added to the relevant nodes in the localisation map in step 308.

Finally, as the new information might result in more accurate pose estimates of already contained localisation nodes, in step 310 the map updater 24 performs optimisation to refine this information, for example using either pose-graph optimisation or bundle adjustment.

The principle of this optimisation is to perform global map loop-closures to link the positions of different localisation nodes originating from the same place. These links can contain relative 6 degrees of freedom (3D position and 3D rotation) difference between positions of the nodes. Alternatively, the relative position can include an additional difference in scale for scale-free systems such as monocular cameras giving 7 degrees of freedom (3D position, 3D rotation and a seventh dimension relating to the relative scale difference). The poses of the nodes are then optimised to minimise the total cost of the graph. This cost is calculated using the constraints imposed upon the graph by the relative poses estimated between nodes. Alternatively, this optimisation can include re-computing the position of localisation features or other stored information used for location.

In some embodiments, based on the output of the localiser, performance, and amount of relevant map localisation nodes, one or more client systems can be requested by the server system to modify the frequency and amount of information included in the localisation requests from those one or more client systems (i.e. a sub-set of the client systems may be requested to modify the information transmitted to the server system, to increase or decrease the amount of data transmitted to the server system). This can serve to optimise bandwidth usage, reflecting the varying need for more data at different regions of the global master map 22, based on location and environmental conditions. For example, if the map does not contain enough relevant information in the location region and/or certain environmental conditions (e.g. it is raining and the global master map 22 only has data for fair weather conditions), the client system can be requested to compensate by sending more data and at a higher rate. Conversely, in a well-mapped area the localisation requests and map updates need not be performed as often. As a result, the bandwidth usage is expected to decrease over time as the global master map 22 gathers more data. In some embodiments, the system can be configured to selectively disable either map updating or localisation such that the system only then performs the other function.

The performance of the entire system 1 can be determined by the plurality of localisation nodes in the global master map 22, the quality of their position estimates of the nodes in the global coordinate frame, the quality of localisation towards these nodes by the localiser module 20 and the quality of the odometry system 34 in the client system 3. The quality of global master map 22 can increase with the amount of data collected by the client systems 3 and integrated as localisation nodes into the global master map 22 on the server system 2. Therefore, the system 1 can perform better over time as more data at different conditions is collected and observed.

In some embodiments, some or all of the client systems do not estimate their position and/or do not transmit an estimated position along with sensor data in localisation requests to the server. Typically, this would be the case for devices that have either a temporarily disabled or malfunctioning odometry system, or limited functionality or hardware, or are producing varyingly inaccurate estimates of position.

In some embodiments, sensor(s) 40 only relates to visual data sensors such as an image camera; a video camera; a monocular camera; a depth camera; a stereo image camera; a high dynamic range camera, a LIDAR sensor; and a radio detection and ranging sensor. Optionally, sensor data may be combined with data from an IMU unit 42 and/or a satellite positioning system (GPS) 44.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention claimed is:

1. A computer-implemented method performed by a computing system of a server that communicates with a plurality of devices over a data network, each device having one or more sensors and maintaining an odometry-based local map in a local coordinate frame that accumulates drift over time, the method comprising:

receiving, by the computing system, a localisation request, wherein the localisation request includes sensor data associated with a device;

determining, by the computing system, one or more localisation nodes from a global map based on the sensor data, the global map representing locations in a global coordinate frame;

generating, by the computing system, localisation data based on the one or more localisation nodes, the localisation data including a global pose of the device in the global coordinate frame at a time of the localisation request; and providing, by the computing system over the data network to the device, the localisation data, wherein the localisation data is configured to:

mitigate the accumulated drift by enabling the device to determine a transform between the local coordinate frame and the global coordinate frame based on the global pose, and update a current global pose of the device by applying the transform to a subsequent odometry-based local pose estimate.

2. The computer-implemented method of claim 1, wherein determining the one or more localisation nodes from the global map comprises:

determining, by the computing system, a location estimate associated with the localisation request; and performing, by the computing system, a search of localisation nodes within a threshold proximity of the location estimate for the one or more localisation nodes.

3. The computer-implemented method of claim 2, wherein performing the search of localisation nodes comprises:

extracting, by the computing system, visual signatures from the sensor data; and determining, by the computing system, the one or more localisation nodes based on the visual signatures, wherein the one or more localisation nodes are associated with signatures that satisfy a threshold similarity with the visual signatures.

4. The computer-implemented method of claim 1, further comprising:

generating, by the computing system, a new localisation node in the global map based on the sensor data; and updating, by the computing system, the global map based on the new localisation node.

5. The computer-implemented method of claim 4, wherein updating the global map comprises:

determining, by the computing system, the new localisation node has a same position as a localisation node in the global map; and linking, by the computing system, the new localisation node with the localisation node in the global map.

6. The computer-implemented method of claim 4, wherein updating the global map comprises:

determining, by the computing system, the new localisation node has a position outside the global map; and extending, by the computing system, the global map based on the new localisation node.

7. The computer-implemented method of claim 4, wherein updating the global map is based on a determination that a threshold number of new localisation nodes have been generated for the global map.

8. The computer-implemented method of claim 1, wherein generating the localisation data comprises aggregating the one or more localisation nodes to determine the global pose of the device.

9. The computer-implemented method of claim 1, wherein the global map includes links between localisation nodes in the global map, wherein the links include relative position differences and relative rotation differences between positions of the localisation nodes.

10. The computer-implemented method of claim 1, wherein each of the one or more localisation nodes includes at least one of: a picture, a position of a visual feature, a depth map, a three-dimensional point cloud, and metadata for a location.

11. A system of a server that communicates with a plurality of devices over a data network, each device having one or more sensors and maintaining an odometry-based local map in a local coordinate frame that accumulates drift over time, the system comprising:

at least one processor; and a memory storing instructions that, when executed, cause the system to perform operations comprising:

receiving a localisation request, wherein the localisation request includes sensor data associated with a device;

determining one or more localisation nodes from a global map based on the sensor data, the global map representing locations in a global coordinate frame;

generating localisation data based on the one or more localisation nodes, the localisation data including a global pose of the device in the global coordinate frame at a time of the localisation request; and providing, over the data network to the device, the localisation data, wherein the localisation data is configured to:

mitigate the accumulated drift by enabling the device to determine a transform between the local coordinate frame and the global coordinate frame based on the global pose, and update a current global pose of the device by applying the transform to a subsequent odometry-based local pose estimate.

12. The system of claim 11, wherein determining the one or more localisation nodes from the global map comprises:

determining a location estimate associated with the localisation request; and performing a search of localisation nodes within a threshold proximity of the location estimate for the one or more localisation nodes.

13. The system of claim 12, wherein performing the search of localisation nodes comprises:

extracting visual signatures from the sensor data; and determining the one or more localisation nodes based on the visual signatures, wherein the one or more localisation nodes are associated with signatures that satisfy a threshold similarity with the visual signatures.

14. The system of claim 11, the operations further comprising:

generating a new localisation node in the global map based on the sensor data; and updating the global map based on the new localisation node.

15. The system of claim 14, wherein updating the global map comprises:

determining the new localisation node has a same position as a localisation node in the global map; and linking the new localisation node with the localisation node in the global map.

16. A non-transitory computer-readable storage medium including instructions that, when executed, cause a computing system of a server that communicates with a plurality of devices over a data network, each device having one or more sensors and maintaining an odometry-based local map in a local coordinate frame that accumulates drift over time to perform operations comprising:

receiving a localisation request, wherein the localisation request includes sensor data associated with a device;

determining one or more localisation nodes from a global map based on the sensor data, the global map representing locations in a global coordinate frame;

generating localisation data based on the one or more localisation nodes, the localisation data including a global pose of the device in the global coordinate frame at a time of the localisation request; and providing, over the data network to the device, the localisation data, wherein the localisation data is configured to:

mitigate the accumulated drift by enabling the device to determine a transform between the local coordinate frame and the global coordinate frame based on the global pose, and update a current global pose of the device by applying the transform to a subsequent odometry-based local pose estimate.

17. The non-transitory computer-readable storage medium of claim 16, wherein determining the one or more localisation nodes from the global map comprises:

determining a location estimate associated with the localisation request; and performing a search of localisation nodes within a threshold proximity of the location estimate for the one or more localisation nodes.

18. The non-transitory computer-readable storage medium of claim 17, wherein performing the search of localisation nodes comprises:

extracting visual signatures from the sensor data; and determining the one or more localisation nodes based on the visual signatures, wherein the one or more localisation nodes are associated with signatures that satisfy a threshold similarity with the visual signatures.

19. The non-transitory computer-readable storage medium of claim 16, the operations further comprising:

generating a new localisation node in the global map based on the sensor data; and updating the global map based on the new localisation node.

20. The non-transitory computer-readable storage medium of claim 19, wherein updating the global map comprises:

determining the new localisation node has a same position as a localisation node in the global map; and linking the new localisation node with the localisation node in the global map.

* * * * *